Jan. 24, 1967 — T. B. HALL — 3,299,491
CUTTING TOOL
Filed Oct. 19, 1965
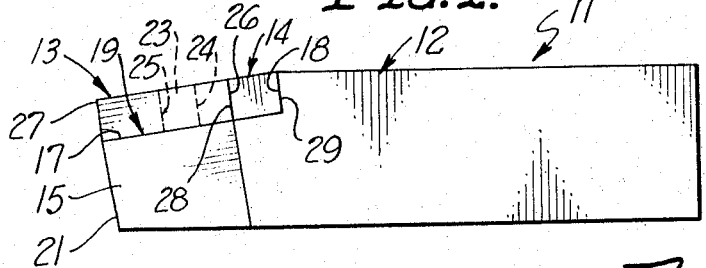
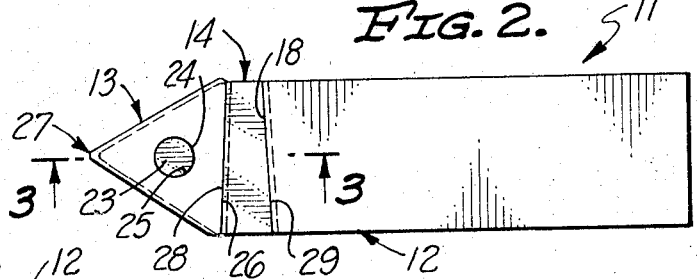
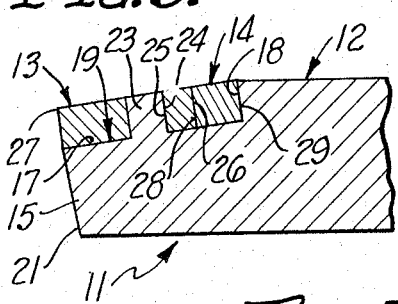
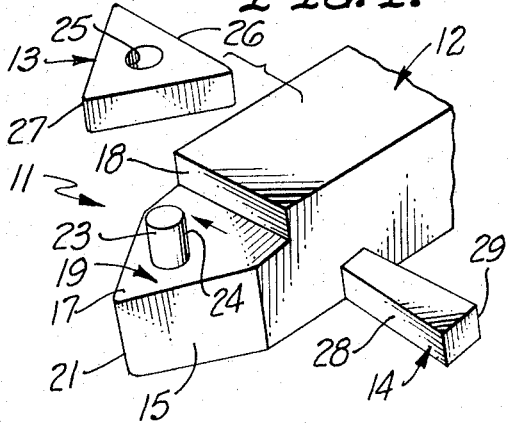
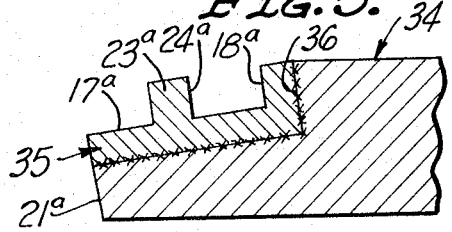
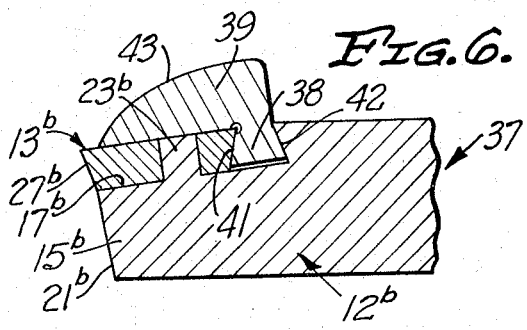
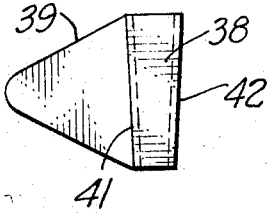
INVENTOR
TELLER B. HALL
BY HIS ATTORNEYS
HARRIS, KIECH, RUSSELL & KERN

United States Patent Office 3,299,491
Patented Jan. 24, 1967

3,299,491
CUTTING TOOL
Teller B. Hall, Los Angeles, Calif.
(1456 La Linda, Lake San Marcos, Calif. 92069)
Filed Oct. 19, 1965, Ser. No. 498,063
6 Claims. (Cl. 29—96)

This invention relates to cutting tools for cutting or boring metals and other hard materials, generally known in the industry as tool holders and boring bars.

Such cutting tools usually include a tool holder or boring bar having secured thereto a disposable carbide or ceramic insert. Such tool holders and boring bars are body members, each of which holds and supports the insert, and is adapted to be attached to a lathe or other cutting machine. Such cutting tools which make external cuts are usually known as tool holders, and cutting tools making internal cuts are known as boring bars. The term "body member" is employed herein as a generic expression for both tool holders and boring bars.

The insert is a small piece of carbide or ceramic which engages and cuts the metal. These inserts wear out in use and must be replaced. It is important that these inserts be correctly held so that they will engage the work at the proper angle to increase the useful life of the insert.

Prior art means for attaching the insert to the body member are quite expensive and complex, requiring several securing parts, such as clamps, bolts, screws, and rotatable cams. Such securing parts are usually disposed within the body member and, accordingly, the body member must be appropriately recessed to accommodate them, which means that such devices cannot be made in small sizes without unduly weakening the body member, and are relatively expensive. Also, some such prior art devices are unsatisfactory because they do not securely hold the insert to the body member thereby allowing the insert to move slightly to a position which will cause increased wear thereon.

Accordingly, a primary object of this invention is to provide a simple and inexpensive cutting tool of the general character described above, which may be adapted for use either as such a tool holder or boring bar, as preferred embodiments.

Another object of this invention is to provide means for securely attaching and rigidly holding an insert to such a body member.

A further object of this invention is to utilize a "sticking" wedge to secure an insert to the body member of a cutting tool. No rotation of the wedge is required. The sticking wedge has opposed surfaces which taper slightly toward each other so that when the wedge is driven into a crevice, forces acting on such sides will not cause the wedge to be cammed out of the crevice. Another object of this invention is to employ a wedge as indicated above, such wedge having opposed sides tapering toward each other at an angle of up to approximately 6° on each side.

An object of this invention is to utilize a wedge to releasably secure an insert to the body member of a cutting tool, said wedge having a chip breaker integral therewith.

A particular object of this invention is to provide a cutting tool including a body member having first and second generally opposed relatively rigid surfaces; a hard insert engaging the first surface of the body member and having a face generally opposed to said second surface of the body member and an exposed cutting surface for engaging and cutting hard material, said face lying between the first and second surfaces of the body member to define a space between the face and the second surface of the body member; and a wedge having first and second generally opposed surfaces for engaging the face and the second surface of the body member respectively to wedge the insert against the first surface. More particularly, another object of this invention is to provide a pin on the body member forwardly of the second surface, said pin rotatably mounting the insert to the body member.

Still another object of this invention is to provide a cutting tool including a body member having a heat-resistant platform thereon, an insert, and a wedge for releasably securing the insert to the body member.

The invention, both as to its organization and method of operation, together with further objects and advantages thereof, may best be understood by reference to the following description taken in connection with the accompanying drawing in which:

FIG. 1 is a side elevational view of a cutting tool constructed in accordance with the teachings of this invention;

FIG. 2 is a plan view of the cutting tool of FIG. 1;

FIG. 3 is a fragmentary sectional view taken along line 3—3 of FIG. 2;

FIG. 4 is an exploded fragmentary perspective view of the cutting tool of FIG. 1;

FIG. 5 is a sectional view similar to FIG. 3 showing a modified form of body member;

FIG. 6 is a fragmentary sectional view similar to FIG. 3 showing a modified form of the cutting tool in which the wedge and chip breaker are integral; and FIG. 7 is a bottom view of the integral wedge and chip breaker of FIG. 6.

Referring to the drawing and in particular to FIGS. 1–4 thereof, reference numeral 11 designates a cutting tool which includes a shank 12, an insert 13 and a wedge 14. The shank 12 is made of a hard metal and includes a forward section 15, the shank being generally rectangular in cross section and attachable to a lathe or other cutting machine (not shown).

The forward section 15 has a generally horizontal surface 17 and a generally vertical wall or shoulder 18 which intersects the horizontal surface to define a recess 19 in the upper portion of the forward section. Preferably the shoulder 18 is inclined forwardly slightly from the vertical and the surface 17 is preferably inclined downwardly slightly from the horizontal as illustrated in FIGS. 1 and 3. If desired, the surface 17 may also be slanted downwardly slightly in the direction of the arrow in FIG. 4. The surfaces 17 and 18 preferably intersect to form substantially a right angle. As best seen in FIG. 4, the forward portion of the surface 17 is generally triangular and a nose surface 21 tapers inwardly and downwardly therefrom.

The shank 12 also includes a cylindrical pin 23 extending upwardly from the surface 17 forwardly of and spaced from the shoulder 18. The pin 23 may be integral with the forward section 15 or otherwise rigidly secured thereto and provides a rearwardly facing surface 24 which is generally opposed to the shoulder 18. The body member 12 is devoid of openings unless a hole must be drilled to accommodate the pin 23 if it is desired to make the pin as a separate part.

The insert 13 is a conventional carbide or ceramic insert, having a central bore 25, a rearwardly facing edge or face 26, and a cutting surface 27. The bore 25 of the insert 13 fits over the pin 23 to mount the insert on the shank 12 for limited rotation relative thereto, and the lower surface of the insert rests on the surface 17 of the shank. The edge 26 is spaced forwardly of the shoulder 18 and between the shoulder and the pin 23. The edge 26 is generally opposed to the shoulder 18, and the cutting surface 27 is exposed adjacent and slightly forward of the forward tip of the nose surface 21.

The wedge 14 is driven into the space between the edge 26 and the shoulder 18 to wedge the insert 13 tightly against the pin 23 and to rigidly orient the insert relative to the shank 12. As best shown in FIGS. 2 and 4, the wedge 14 is generally rectangular in cross section and tapers longitudinally, the taper being sufficiently small that the wedge 14 is a "sticking" wedge, i.e. a wedge that will remain in place and one that cannot be cammed out of position by the forces exerted thereon by the insert 13 during a cutting operation. By way of illustration, the wedging surfaces 28 and 29 may taper toward each other at an angle of up to approximately 6°; i.e. the planes of the wedging surfaces intersect to form an angle of up to about 6°.

In utilizing the wedge 14, the narrow end thereof is inserted between the edge 26 of the insert and the shoulder 18 and the wedge is driven inwardly. As wider portions of the wedge 14 are forced between the edge 26 and the shoulder 18, the insert 13 is caused to rotate clockwise slightly as viewed in FIG. 2, until the wedge is fully seated, as shown in FIG. 2, in which position the wedge rigidly orients the insert and holds the cutting surface 27 thereof at the desired cutting angle. The angular position of the wedge may be controlled by varying the taper of the wedging surfaces thereon and/or the position of the shoulder 18. As shown in FIG. 2, the shoulder 18 is inclined to the left as it extends upwardly.

By tapping on the narrow end thereof, the wedge 14 may be removed easily from the remainder of the cutting tool 11. If desired, the wedge 14 may be magnetized or driven into and out of the cutting tool 11 with a magnetized tool so as to guard against losing the wedge.

Thus, only the wedge 14 is required to secure the insert 13 on the pin 23. No parts requiring accurate machining are needed. As shown in FIGS. 1–4, the wedge 14 is imperforate and is held in place solely by the contact of the surfaces 28 and 29 with the shoulder 18 and the edge 26 of the insert 13. No rotating mechanisms are required in using the wedge. The wedge 14 may be quickly driven into and out of position in the cutting tool 11 and securely holds the insert at the desired cutting angle. Since the tapered sides of the wedge 14 are relatively long, any wear thereon is distributed over a large area, to provide long-wearing characteristics, which is an advantage. The wedge 14 fixes the position of the insert 13 relative to the shank 12 and retains such position regardless of the direction of the cut. Also, since obviously there is only one direction in which the wedge 14 can be driven between the insert 13 and the shoulder 18 to align the insert properly with the forward section 15, there is no danger of a careless mechanic mounting the insert improperly for correct cutting in either direction of cutting, and no resetting or adjustment of the mounting is required when the rotation of the shank is reversed.

FIG. 5 illustrates a modified cutting tool including a shank 34 and a heat-resistant carbide platform or base 35. The shank 34 has a large cut-out portion 36 at the forward end thereof to which the platform 35 may be secured as by brazing. The general shape of the shank 34 is similar to the shape of that shown in FIGS. 1–4, and corresponding elements are designated by corresponding reference numerals, but with the suffix "a" added thereto. In the embodiment of FIG. 5, the pin 23a is preferably integral with the platform 35, and the shoulder 18a is also formed in the platform. Thus, when the heat-resistance platform 35 is used, the insert 13 only contacts the platform and the wedge and does not contact the shank 34. The pin 23a is adapted to mount an insert similar to the insert 13, and a wedge similar to the wedge 14 is driven between the insert and the shoulder 18a to mount the insert in fixed cutting position on the tool.

FIGS. 6 and 7 illustrate a cutting tool 37 which is generally similar to the cutting tool 11, corresponding elements being designated by corresponding reference numerals but with the suffix "b" added thereto, except that the former is provided with a wedge 38 and a chip breaker 39 integral therewith. The wedge 38 has wedging surfaces 41 and 42 which, in addition to being tapered in the same manner as the wedging surfaces 28 and 29 of the embodiment of FIGS. 1–4, may also taper slightly toward each other as they extend transversely or upwardly from the surface 17b to accommodate an insert 13b with a side clearance rake as shown in FIG. 6. The chip breaker 39 is integral with the wedge 38 along the upper surface thereof and overlies a substantial portion of the insert 13b. The chip breaker 39 may have a curved convex upper surface 43 as indicated in FIG. 6. As shown in FIG. 6, there is a small clearance between the bottom surface of the wedge 38 and the surface 17b, and the surface 42 and the shoulder are inclined toward the pin 23b as they extend outwardly.

The embodiment of FIG. 6 has the additional advantage of further simplifying construction and assembly of cutting tools which utilize a chip breaker. Set-up time for the cutting machine is reduced as the cutting tool 37 is ready for operation merely by insertion of the integral wedge and chip breaker.

As will be understood by those skilled in the art, although the invention has been described as embodied in a tool holder, it may also be similarly embodied in a boring bar, as the terms are used in the art. In either embodiment, the tool may be made smaller in its largest cross-sectional dimension than similar known tools on the market.

Many changes, modifications, and substitutions may be made without necessarily departing from the spirit and scope of this invention.

What is claimed is:

1. A cutting tool for cutting hard material, said tool being attachable to a cutting machine and comprising:
    a body member including first and second generally opposed and relatively rigid surfaces, said body member being attachable to the cutting machine;
    a hard insert engaging said first surface of said body member and including a face generally opposed to said second surface of said body member and an exposed cutting surface for engaging and cutting the hard material, said face lying between said first and said second surfaces of said body member to define a space between said face and said second surface of said body member;
    a sticking wedge having first and second generally opposed surfaces for engaging said face and said second surface of said body member, respectively, to wedge said insert against said first surface; and
    a chip breaker integral with said wedge and adjacent said insert.

2. A cutting tool for cutting hard material, said cutting tool being attachable to a tool holder and comprising:
    a body member having an upwardly extending rigid surface intermediate the ends thereof, said body member being attachable to the tool holder and including a pin extending upwardly forwardly of said rigid surface;
    a hard insert rotatably mounted on said pin, said insert having an exposed cutting surface engageable with the hard material to cut the latter and a rearwardly directed face lying between said pin and said rigid surface to define a space between said rigid surface and said face, said face being generally opposed to said rigid surface;
    a sticking wedge having opposed wedging surfaces slidable longitudinally into said space for engaging said face and said rigid surface, respectively, to wedge at least a portion of said insert between said wedge and said pin, said wedging surfaces tapering longitudinally toward each other; and a chip breaker integral with said wedge and overlying at least some of said insert.

3. A cutting tool for cutting hard material, said cutting tool being attachable to a tool holder and comprising:

a body member having an upwardly extending rigid surface intermediate the ends thereof, said body member being attachable to the tool holder and including a pin extending upwardly forwardly of said rigid surface;

a hard insert rotatably mounted on said pin, said insert having an exposed cutting surface engageable with the hard material to cut the latter and a rearwardly directed face lying between said pin and said rigid surface to define a space between said rigid surface and said face, said face being generally opposed to said rigid surface; and a sticking wedge having opposed wedging surfaces slidable longitudinally into said space for engaging said face and said rigid surface, respectively, to wedge at least a portion of said insert between said wedge and said pin, said wedging surfaces tapering longitudinally toward each other, said rigid surface being inclined toward said pin as it extends outwardly, the wedging surface in engagement with said rigid surface also being tapered toward said pin as it extends outwardly, a portion of said wedge extending out of said space and overlying a portion of said insert, said portion of said wedge being engageable with said portion of said insert.

4. A cutting tool for cutting hard material, said cutting tool being attachable to a tool holder and comprising:

a body member having an upwardly extending rigid surface intermediate the ends thereof, said body member being attachable to the tool holder and including a pin extending upwardly forwardly of said rigid surface;

a hard insert rotatably mounted on said pin, said insert having an exposed cutting surface engageable with the hard material to cut the latter and a rearwardly directed face lying between said pin and said rigid surface to define a space between said rigid surface and said face, said face being generally opposed to said rigid surface; and a sticking wedge having opposed wedging surfaces slidable longitudinally into said space for engaging said face and said rigid surface, respectively, to wedge at least a portion of said insert between said wedge and said pin, said weding surfaces tapering longitudinally toward each other, said wedging surfaces also tapering transversely, a portion of said wedge extending out of said space and overlying at least a portion of said insert, said portion of said wedge being engageable with said portion of said insert.

5. A cutting tool as defined in claim 4 wherein the bottom surface of said wedge is spaced from said body member to define a clearance space.

6. A cutting tool as defined in claim 4 wherein said portion of said wedge forms a chip breaker.

References Cited by the Examiner

UNITED STATES PATENTS

| | | | |
|---|---|---|---|
| 2,037,642 | 4/1936 | Scribner | 29— 96X |
| 2,264,299 | 12/1941 | Crosby | 29—105 |
| 2,808,638 | 10/1957 | Filippi | 29—96 |
| 3,176,377 | 4/1965 | Milewski | 29—96 |
| 3,192,602 | 7/1965 | Copeland | 29—96 |
| 3,192,603 | 7/1965 | Greenleaf | 29—96 |

ANDREW R. JUHASZ, *Primary Examiner.*

HARRISON L. HINSON, *Examiner.*